Patented Jan. 5, 1954

2,665,263

UNITED STATES PATENT OFFICE 2,665,263

PREPARATION OF IMPROVED POLYMERIZ-
ABLE UNSATURATED POLYESTER COMPO-
SITIONS AND POLYMERIZED MATERIAL
THEREFROM

Arthur M. Howald, Perrysburg, Ohio, assignor, by mesne assignments, to Allied Chemical & Dye Corporation, New York, N. Y., a corporation of New York No Drawing. Application August 31, 1949,
Serial No. 113,482

9 Claims. (Cl. 260—40)

The invention relates to the preparation of polymerizable unsaturated polyester compositions having improved physical and chemical properties, and to the preparation of polymerized materials therefrom having improved water-resistance and electrical properties.

A polymerizable unsaturated polyester (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperature is a great handicap in fabricating operations. By the time a urea-formaldehyde or phenol-formaldehyde composition has reached a fused state in a fabricating operation, its hardening already has begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat-hardenable polyester, such as glycerol phthalate, is hardened by esterification with elimination of water. A polyester that is hardened by esterification cannot be employed to make a molded article or other solid body because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without the evolution of volatiles.

For the foregoing reasons, a polymerizable unsaturated polyester is particularly well adapted for many industrial uses. However, a polymerizable unsaturated polyester has certain physical and chemical properties which leave something to be desired. For example, the resinous nature of a polymerizable unsaturated polyester ordinarily causes the composition in which it is used to be a sticky, putty-like composition which is difficult to handle. Also, such a polyester is chemically active in that it causes mold staining and corrosion of a mold to such an extent that molded articles have a tendency to stick to the mold. Moreover, hardened or polymerized articles from such a polyester have inferior water-resistance and electrical properties.

The principal object of the invention is the production of a novel polymerizable unsaturated polyester composition which has greatly improved physical and chemical properties.

Another object of the invention is the production of a novel material comprising a polymerized unsaturated polyester, which, after polymerization, has greatly improved water-resistance and electrical properties. More specific objects and advantages are apparent from the description, which merely discloses and illustrates and is not intended to limit the scope of the invention.

A composition embodying the invention, which has improved physical and chemical properties and which upon polymerization has improved water-resistance and electrical properties, comprises a polymerizable unsaturated polyhydric alcohol-polycarboxylic acid polyester and a base of a metal of group II (of the periodic system).

The present invention is based upon the discovery that a base of a metal group II, when incorporated in a polymerizable unsaturated polyester composition, imparts not only a substantial improvement in the physical and chemical properties of the composition but also imparts an improvement in the water-resistance and electrical properties of the polymerization product thereof. The incorporation of such a metal base in a polymerizable unsaturated polyester composition reduces substantially the stickiness of the composition and imparts to the composition a certain stiffness, thereby making the composition much easier to handle industrially. Also, such a metal base in a polymerizable polyester composition reduces substantially the tendency of the composition to stain or corrode a mold. Moreover, a polymerized polyester composition containing the metal base has been found to be greatly improved in water-resistance and electrical properties.

Although it is not desired to limit the invention to any particular theory, it is believed that the fundamental theoretical considerations of the instant invention are as follows: There are two types of linkages in the molecules of a product obtained by the polymerization of an unsaturated polyester resin, namely, those formed through esterification of the carboxy radicals with the alcoholic hydroxy radicals, and those formed through (addition) polymerization at the olefinic double bonds. The inferior water-resistance of a solid, infusible polymerized polyester resin is believed to be due, at least in part, to the presence of an appreciable number of unesterified carboxy and hydroxy radicals in the molecules of such a resin. The presence of such radicals is understood to be due to incomplete esterification. The present invention is based upon the discovery that, when used as agents for "fixing" such radicals, the bases of metals of group II produce outstanding improvements in the properties of the polyesters and also provide numerous advantages in the industrial use of the polyesters.

A polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). Ordinarily it is desirable that the unsaturated polyester be polymerizable into an infusible or high melting point resin, so that the proportion of unsaturated components should be such that the polyester contains an average of more than one double bond per molecule (for example, there may be an average of eleven or more double bonds in every ten molecules of the polyester); and for the purposes of the instant invention it is to be understood that the term "unsaturated polyester" means a polyester that is polymerizable into an infusible or high melting point resin.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Each of such unsaturated dibasic acids contains a polymerizably reactive $\Delta^{2,3}$-enedioyl group, and a polymerizable unsaturated polyester or alkyd prepared from any one of such acids contains a plurality of such polymerizably reactive $\Delta^{2,3}$-enedioyl groups. In other words, each of the acids contains a polymerizably reactive $\Delta^{2,3}$-enoyl group (i. e., a group having the structure

and such groups are contained in dioyl radicals in the polyester molecule; hence the dioyl radicals may be defined as $\Delta^{2,3}$-enedioyl radicals (e. g., butenedioyl or ethenedicarboxylyl radicals).

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3 or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester (prepared by reaction under conditions which prevent any appreciable addition polymerization) varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquor having an acid number of 18. If ethylene glycol were substituted for the diethylene glycol in the foregoing procedure, it would be difficult to reduce the acid number below 40 without causing polymerization, and the product would be a very thick gum.

Alternatively, the first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients;

and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 180° to about 210° F. A solution comprising one or more polymerizable unsaturated polyesters and one or more polymerizable monomeric compounds is particularly useful as a binder. Either the unsaturated polyester or the monomeric compound or both may be partially polymerized before the ingredients are mixed. Polymerizable monomeric compounds that are useful for the preparation of such a solution include the polyallyl monomeric esters, examples of which include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

A polymerizable unsaturated polyester alone or in solution as hereinbefore described may be used in any of the well known industrial polyester compositions, such as polyester molding compounds and polyester casting and adhesive compositions.

A polymerizable unsaturated polyester molding compound is a composition which consists essentially of a filler, a polymerizable polyester (or solution thereof) of the type hereinbefore described and a catalyst for the polymerization of such polyester, with any of the usual molding lubricants, plasticizers and coloring matter. In the molding compound the filler furnishes an improvement in the physical properties of the polymerized polyester, which, in turn, acts as a binder for the filler. The filler may be a cellulosic material such as alpha cellulose; or the filler may be a mineral material in granular form such as clay, mica, silica and ground glass, or in fiber form such as glass fibers and asbestos.

Since the function of the polyester in a molding compound is that of a binder, the proportion of a cellulosic filler in a molding compound embodying the invention may range from the minimum amount capable of appreciably improving the physical properties of the hardened product (i. e., about 1 per cent) to the maximum proportion which may be held together satisfactorily by the polyester binder in the hardened product (i. e., about 80 per cent). Generally speaking, the preferred range for a cellulosic filler is from about 40 per cent to about 75 per cent of the molding compound, and the best all-around results are obtained at about 55 per cent to 60 per cent. The molding compounds containing very small amounts of a cellulosic filler are usually special compunds in which a mixed filler of a cellulosic material and a mineral material is employed. It may be desirable to use a mixed filler of a cellulosic material and a mineral material such as silica or asbestos in a cold molding composition, for example, in which the per cent of total filler in the composition may be as high as 90 per cent.

It may be desirable to use mineral material exclusively as a filler in a molding compound embodying the invention, particularly when very high water-resistance is required. The proportion of a mineral filler may range from the minimum amount required to improve appreciably the physical properties of the hardened product (i. e., about 5 per cent) to the maximum proportion which may be held together or bound satisfactorily by the polyester (i. e., about 85 per cent). Generally speaking, the preferred range for mineral fillers is from about 60 per cent to about 70 per cent of filler in the molding compound, and the best all-around results are obtained in the upper portion of such range.

In the production of a molding compound embodying the invention the mixing of the filler with the polymerizable polyester may be carried out by any of the known methods. If the polyester is very viscous, it may be necessary to incorporate the filler in the polyester in a heated two-roll (differential speed) rubber mill or it may be desirable to heat the polyester in order to reduce the viscosity sufficiently to permit the use of other mixing procedures. Ordinarily the viscosity of the polyester is such that kneading or equivalent mixing procedures may be used satisfactorily. In some cases it may be desirable to dilute the polyester with a solvent in order to facilitate mixing with the filler.

Casting and adhesive compositions embodying the invention, of course, may contain as little as 1 per cent of a filler, and the maximum per cent of a filler in such compositions is simply that amount which may be added to the polyester compositions without rendering the compositions too viscous to handle. For example, in adhesive compositions the proportion of a cellulose filler to the polyester may range from as low as about 1:100 to as high as about 1:4, the preferred proportions being from about 1:30 to about 1:5. The proportion of a mineral filler to the polyester may range from as low as about 1:100 to as high as about 1:1, the preferred proportions being from about 1:5 to about 1:2. In the production of casting and adhesive compositions embodying the invention the mixing of the filler with the polymerizable polyester may be carried out by any of the known methods, for example, by heating the polyester to reduce its viscosity, thus permitting the use of the ordinary mixing methods hereinbefore described for the preparation of a molding compound.

Although polyester compositions embodying the invention which contain cellulosic fillers may be polymerized to form very useful articles of great strength, the polyester compositions containing mineral fillers may be polymerized to obtain articles of great strength which also have outstanding water-resistance and electrical properties. In the practice of the invention the mineral fillers are preferred since they supplement to the greatest extent the improvements in water-resistance and electrical properties obtained in the practice of the invention. Among the mineral fillers, Canadian asbestos has been found to impart the greatest strength to the polymerized polyester compositions of the invention, and, therefore, Canadian asbestos is preferred when strength is an essential factor. Also in the practice of the invention it has been found that a filler mixture of Canadian asbestos and kaolin or China clay may be used to obtain the best all-around results, in view of the facts that a substantial proportion of the asbestos may be replaced by kaolin without appreciably altering the strength, and that kaolin imparts greater water-resistance to the polymerized composition than does asbestos. Moreover, kaolin is less expensive than asbestos. A preferred form of kaolin for use in the invention is a commercial product known as "Georgia clay" (e. g., "Witco Ideal").

Since the polymerizable polyester is fusible and plastic at relatively low temperatures, it is possible to adjust the amounts of catalyst and inhibiting agent so that the hardening at such temperature takes place at a reasonable rate to allow ample opportunity for shaping and molding of the composition. In this manner molding compounds may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide; or a mixture of such substances may be used as the curing catalyst.

The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, a polyester prepared from maleic anhydride and diethylene glycol, in a molding compound of the invention containing about 3 per cent of benzoyl peroxide, may be cured at approximately the same rate as a molding compound, containing a similar polyester prepared from fumaric acid and diethylene glycol, in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the filler by grinding it with the filler in a ball mill, for example, before the fibers are mixed with the polyester. In some cases a filler may be mixed with a solution (in a volatile solvent) of the polymerization catalyst and dried before the filler is mixed with the polyester. When the present method is carried out in the production of a molding compound or a casting composition, plasticizers, lubricants, pigments and other coloring matter may be incorporated if desired.

The metal base of the invention may be considered a portion of the filler for the purpose of determining many of the physical properties of the polyester composition, and one of the most amazing aspects of the present invention resides in the fact that the metal base and cellulose, mineral fibers, non-fibrous minerals or mixtures thereof may be used as the ingredients of a filler combination which imparts substantially greater water resistance to the polyester composition than any one of such ingredients used alone.

The full benefit of the use of the metal base in the practice of the invention is obtained simply by incorporating the metal base in the polyester in the same manner as any filler, according to the procedures hereinbefore described. The metal base may be incorporated in the polyester alone or as a mixture with the fillers hereinbefore mentioned. In fact, although the metal base has several chemical functions, it also functions physically as a part of the filler, and can be the only filler used in the practice of the invention. In determining the total amount of filler used the amount of metal base is added to the amount of other filler used, so that the proportion of the total filler used in the practice of the invention is within the range hereinbefore described, the preferred range being from about 60 per cent to about 70 per cent of the polyester composition.

The magnitude of the improvement in a single property, such as the water resistance of molded articles, that is obtained in the practice of the invention may be demonstrated by tests carried out as follows:

A polymerizable unsaturated linear polyester is prepared by the procedure hereinbefore described for a charge consisting of 1.05 mols of monoethylene glycol, 1 mol of maleic anhydride and an amount of hydroquinone equal to 0.04 per cent of the charge. The charge is heated to 220° C. (over a period of two hours) and is then held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (1.5 parts) and benzoyl peroxide (1.5 parts), as a catalyst, to form a solution. A composition consisting of the resulting solution, an amount of asbestos equal to 25 per cent of the composition, an amount of kaolin (Georgia clay) equal to 40 per cent of the composition and, as a lubricant, an amount of zinc stearate equal to 2 per cent of the composition is then milled for 10–12 minutes on a heated 2-roll differential speed rubber mill at the lowest temperature at which a homogeneous mass can be obtained (not more than about 75° C.). The resulting composition is removed in sheets, is allowed to solidify fully while at about 80–90° F. and then is granulated in a high speed cutter to a maximum particle diameter of about 1/8 inch. The granulated composition is compression molded to produce articles of dimensions suitable for physical testing. The composition has excellent flowing properties, and is fast-curing and gives moldings free from gas.

The water resistance tests employed are standard tests for plastic materials and are considered to be capable of showing generally the water resistance characteristics that are important in industrial materials of this class. Water resistance varies with the amount of moisture that an article is capable of absorbing, because the degree of deterioration upon exposure to moisture varies with the amount of water absorbed.

The test piece, referred to hereinafter, for determination of water absorption is a seven-gram two-inch diameter disk molded for one minute under a pressure of 17,000 pounds per square inch of projected area in a mold heated with steam at 75 pounds per square inch gauge pressure. The disk is immersed in hot or cold water for a given period of time, and the water absorption is measured as the gain in weight (in grams) during immersion. In the case of the foregoing composition, it was found that a test piece immersed in boiling water for one hour absorbed 0.095 gram of water, and one immersed in cold water absorbed 0.040 gram of water in one day, 0.055 gram of water in two days, or 0.130 gram of water in seven days.

If a procedure is carried out which is the same as the foregoing procedure except that the filler used is as follows:

Per cent of the composition
Kaolin --------------------------------- 37.5
Asbestos ------------------------------- 22.5
Metal base (zinc oxide) ---------------- 2.5 the water absorption, in cold water for one day, for a test piece so obtained is about 12 per cent less than that of a test piece prepared according to the foregoing procedure wherein no metal base was used. If a procedure is carried out which is the same as the foregoing procedure except that filler is used is as follows:

Per cent of the composition
Kaolin --------------------------------- 40
Asbestos ------------------------------- 18
Metal base (zinc oxide) ---------------- 9 the water absorption, in boiling water for one hour, for a test piece so obtained is about 40 per cent less than that of a test piece containing no metal base.

In the practice of the invention a solution comprising one or more polymerizable unsaturated polyesters and one or more polymerizable monomeric compounds is particularly advantageous, because the polyester has desirable physical properties and hardens very rapidly whereas the presence of the monomeric compound causes the polymerized product to be much more water resistant and insoluble. Moreover, the combination (solution) of the polyester and the monomeric compound usually polymerizes much more rapidly than either of such substances alone. Such a solution usually contains about 5 per cent to about 35 per cent of the polymerizable monomeric compound and about 95 per cent to about 65 per cent of the polymerizable polyester.

The nature of the change in water resistance which is brought about by a change in the per cent of the monomeric compound in solution with the polyester may be demonstrated by carrying out a procedure which is the same as the foregoing procedures except that different amounts of the polyester and the monomer are used in the solution, and the filler used is as follows:

Per cent of the composition
Kaolin --------------------------------- 40
Asbestos ------------------------------- 20.5
Metal base (zinc oxide) ---------------- 2.5

Table 1 (below) more specifically describes the compositions from which test pieces are molded by specifying the per cent of polyester in the solution (line 2) and the per cent of monomer (diallyl phthalate) in the solution (line 3). Also in Table 1, the water absorption (in grams) is given for tests in which the test pieces are immersed in boiling water for one hour (line 4), or in cold water for one day (line 5), two days (line 6) or seven days (line 7).

TABLE 1

| 1. Run No. | 1A | 2A | 3A |
|---|---|---|---|
| 2. Percent polyester | 100 | 95 | 80 |
| 3. Percent monomer | 0 | 5 | 20 |
| 4. Boiling water absorption | 0.200 | 0.165 | 0.080 |
| 5. Cold water absorption (1 day) | 0.080 | 0.075 | 0.045 |
| 6. Cold water absorption (2 days) | 0.120 | 0.105 | 0.065 |
| 7. Cold water absorption (7 days) | 0.215 | 0.180 | -------- |

From Table 1 it can be seen that the decrease in the water absorption of the polyester composition is about 60 per cent in the one hour boiling water absorption test when the per cent monomer is increased from 0 per cent (run No. 1A) to 20 per cent (run No. 3A). Also, it can be seen that a corresponding decrease in the cold water absorption is obtained by increasing the monomer in the polyester composition.

A solution similar to that obtained by dissolving the polyester in the foregoing monomeric compounds may be prepared by dissolving the polyester, before use, in a polymerizable substance such as styrene, vinyl acetate, methylmethacrylate or methylacrylate.

As hereinbefore mentioned the metal base which may be used in the practice of the invention is a base formed of a metal of group II of the periodic system. These metals include magnesium (atomic weight=24.3), calcium (atomic weight=40.1), zinc (atomic weight=65.4), strontium (atomic weight=87.6), cadmium (atomic weight=112.4), barium (atomic weight=137.4) and mercury (atomic weight=200.6). It is believed that beryllium (atomic weight=9) and radium (atomic weight=226.0) are too rare and expensive to be considered, and, accordingly, for the practical purposes of the instant invention the metals of group II having atomic weights between 10 and 220 are the metals from which the base is formed that may be used in the practice of the invention. Although the bases of each of the foregoing metals have the common characteristic desired in the instant invention, namely, the ability to reduce the water absorption and improve the electrical properties, it has been found that there are several peculiar differences in behavior among these bases so that one base may be preferred over all the others for one particular use.

Some of the differences in the characteristic behavior of the metal bases in the practice of the invention may be demonstrated by carrying out tests wherein the metal base used is a metal oxide, as follows:

A polymerizable unsaturated linear polyester is prepared by the procedure hereinbefore described for a charge consisting of 1.05 mols of monoethylene glycol, 1 mol of maleic anhydride and an amount of hydroquinone equal to 0.04 per cent of the charge. The charge is heated to 220° C. (over a period of two hours) and is then held between 220° C. and 226° C. for six more hours. The resulting polyester (95 parts), which has an acid number of about 35, is cooled to 67–70° C. and is mixed thoroughly with diallyl phthalate (5 parts) and a paste of tricresyl phosphate (1.5 parts) and benzoyl peroxide (1.5 parts), as a catalyst, to form a solution. A composition consisting of the polymerizable polyester solution so prepared, an amount of asbestos equal to 23 per cent of the composition, an amount of kaolin (Georgia clay) equal to 40 per cent of the composition and, as a lubricant, an amount of zinc stearate equal to 2 per cent of the composition is then milled for 10–12 minutes on a heated two-roll differential speed rubber mill at the lowest temperature at which a homogeneous mass can be obtained (not more than about 75° C.). The resulting composition is removed in sheets, is allowed to solidify fully while at about 80–90° F. and then is granulated in a high speed cutter to a maximum particle diameter of about ⅛ inch. The granulated composition is compression molded to produce articles of the dimensions hereinbefore described. The composition has excellent flowing properties, and is fast-curing and gives moldings free from gas. Test pieces of compositions embodying the invention are obtained by carrying out procedures which are the same as the foregoing except that a small portion of the kaolin is replaced by an oxide of a metal of group II.

The test pieces so prepared are subjected to the standard water resistance tests and also are tested for hardness before and after being subjected to the water resistance tests. The reduction in the hardness of a test piece which results from its immersion in water is another standard method of indicating the degree of deterioration caused by immersion in water.

Table 2 (below) more specifically describes the compositions from which the test pieces are molded by specifying the chemical symbol of the metal from which the base (oxide) is formed (column 1) and the amount of such metal base used, in per cent of the composition (column 2). Also in Table 2, the water absorption (in grams) is given for tests in which the test pieces are immersed in cold water for one day (column 3), two days (column 4) or 7 days (column 5), or are immersed in boiling water for one hour (column 6). The Barcol hardness is given for the test pieces before (column 7) and after (column 8) immersion in boiling water for one hour.

TABLE 2

| Metal base | | Water absorption | | | | Barcol hardness | |
|---|---|---|---|---|---|---|---|
| Metal | Amount | Cold 1 day | Cold 2 days | Cold 7 days | Boiling 1 hour | Before | After 1 hr. boiling water |
| Col. 1 | Col. 2 | Col. 3 | Col. 4 | Col. 5 | Col. 6 | Col. 7 | Col. 8 |
|  | 0 | 0.153 | 0.233 | 0.297 | 0.164 | 60.5 | 27 |
| Mg | 2 | 0.072 | 0.116 | -------- | 0.158 | -------- | -------- |
| Ca | 2 | 0.041 | 0.060 | 0.134 | 0.117 | 53.5 | 34.5 |
| Sr | 2 | 0.045 | 0.072 | 0.185 | 0.125 | 52.5 | 31 |
| Zn | 5 | 0.074 | 0.110 | 0.194 | 0.146 | 62 | 34.5 |
| Cd | 5 | 0.025 | 0.038 | 0.100 | 0.096 | 58 | 38.5 |
| Hg | 5 | 0.036 | 0.058 | 0.157 | 0.109 | 56.5 | 37 |

From Table 2 it can be seen that, although the presence of any one of the metal oxides in an infusible polyester causes an appreciable improvement in the water-resistance of the polyester, the extent of such improvement for one of the metal oxides may be substantially different from that for another of the metal oxides. For example, the amount of water absorbed during immersion in cold water for one day (column 3) by the polyester containing magnesium oxide is about ½ of the amount of water so absorbed by the polyester containing no metal oxide; but the amount of water so absorbed by the polyester containing cadmium oxide is about ⅙ of that absorbed by the polyester containing no metal oxide. In other words, cadmium oxide causes about three times as great an improvement as magneuism oxide, according to the results shown in Table 2.

The metals of group II may be classified into two categories, namely, the amphoteric metals (zinc, cadmium and mercury) and the non-amphoteric metals (magnesium, calcium, strontium and barium). The non-amphoteric metals form more strongly alkaline compounds than do the amphoteric metals. Referring to Table 2, it can be seen that, as a group, the amphoteric metal oxides produce better results than do the non-amphoteric metal oxides in the practice of the invention. Among the non-amphoteric metal oxides, those of the alkaline earth metals are preferred in the practice of the invention since they produce results substantially better than those obtained using magnesium oxide. Among the amphoteric metal oxides, those of the heavier metals cadmium and mercury (i. e., the metals having an atomic weight between 110 and 220), are found to give the best results in the practice of the invention, although all of the amphoteric metal oxides give very good results.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent in part at least, upon the acid present. For the purpose of the instant invention it is to be understood that the base formed of a metal of group II is one that is in fact a metal base with respect to the polymerizable polyester, which is present in the practice of the invention. In other words, the metal base is a compound which releases its cation to replace the hydrogen of the carboxy radicals in the polymerizable polyester. Presumably, such a carboxy radical acts as an acid in that it displaces acids weaker than itself from their salts, but will not displace acids stronger than itself from their salts. However, the term "metal base" does not include those metal salts, such as zinc stearate, which are used as lubricants or other modifiers in a polyester resin, because the salts of such long chain (i. e., over 6 carbon atoms) carboxylic acids are so little dissociated that they do not release the metal cation to replace the hydrogen of the carboxy radicals.

It has been found that the metal base used in the practice of the invention must be the substitution product of a substance with a labile hydrogen atom, having a dissociation constant (for the hydrogen) at least as small as about $3 \times 10^{-7}$, in which the labile hydrogen atom has been replaced by a valence of a metal of group II. In other words, in order that a compound of such a metal may be basic in the practice of the invention, it must be a compound of such a metal with a substance having a dissociation constant (for the labile hydrogen atom) equal to or less than that of carbonic acid. The most common examples of such metal bases include the oxides, hydroxides, borates, carbonates, and alcoholates such as the methoxides and ethoxides of such metals.

The complex character of the behavior of the metal base in the practice of the invention is further indicated by the fact that the behavior of a metal salt may be entirely different from the behavior of the corresponding metal oxide. For example, the behavior of the carbonates of the non-amphoteric metals is substantially different from that of the corresponding oxides, and this fact may be demonstrated by carrying out a procedure that is the same as that used to obtain the results given in Table 2 except that carbonates instead of oxides of the metals of group II are used.

Table 3 (below) more specifically describes the compositions from which the test pieces are molded by specifying the chemical symbol of the metal from which the base is formed (column 1) and the amount of such metal base (carbonate) used, in per cent of the composition (column 2). Also in Table 3, the water absorption (in grams) is given for tests in which the test pieces are immersed in cold water for one day (column 3), two days (column 4) or seven days (column 5), or are immersed in boiling water for one hour (column 6). The Barcol hardness is given for the test pieces before (column 7) and after (column 8) immersion in boiling water for one hour.

TABLE 3

| Metal base | | Water absorption | | | | Barcol hardness | |
|---|---|---|---|---|---|---|---|
| Metal | Amount | Cold 1 day | Cold 2 days | Cold 7 days | Boiling 1 hour | Before | After 1 hr. boiling water |
| Col. 1 | Col. 2 | Col. 3 | Col. 4 | Col. 5 | Col. 6 | Col. 7 | Col. 8 |
|  | 0 | 0.153 | 0.233 | 0.297 | 0.164 | 60.5 | 27 |
| Mg | 5 | 0.063 | 0.099 | 0.229 | 0.122 | 58.5 | 34.5 |
| Ca | 5 | 0.049 | 0.077 | 0.183 | 0.111 | 56 | 34 |
| Sr | 5 | 0.047 | 0.071 | 0.177 | 0.108 | 56 | 36.5 |
| Ba | 5 | 0.033 | 0.060 | 0.136 | 0.095 | 62 | 39.5 |
| Zn | 5 | 0.097 | 0.150 | 0.281 | 0.126 | 59 | 35 |

From Table 3 it can be seen that, although the presence of any one of the metal carbonates in an infusible polyester causes an appreciable improvement in the water resistance of the polyester, the extent of such improvement for one of the metal carbonates may be substantially different from that of another of the metal carbonates. For example, the amount of water absorbed during immersion in cold water for one day (column 3) by the polyester containing magnesium carbonate is about ⅖ of the amount of water so absorbed by the polyester containing no metal carbonate; whereas the amount of water so absorbed by the polyester containing barium carbonate is only about ⅕ of that absorbed by the polyester containing no metal oxide. Also, the behavior of the metal carbonates is substantially different from that of the corresponding oxides (shown in Table 2), for example, in that a non-amphoteric metal carbonate gives better results than the corresponding non-amphoteric metal oxide, whereas an amphoteric metal oxide gives better results than the corresponding amphoteric metal carbonate (i. e., zinc carbonate). Among the non-amphoteric metal carbonates, those of the alkaline earth metals are preferred since they produce results substantially better than those obtained using magnesium carbonate; and among the alkaline earth metal carbonates that of the heaviest metal, barium, is found to give the best results in the practice of the invention, although all of the non-amphoteric metal carbonates give results better than those given by zinc carbonate. Also, it is noted that barium carbonate gives the best results in the Barcol hardness test.

Although it is not desired to limit the invention to any particular theory, it is believed that many of the peculiarities of the behavior of the metal base in the practice of the invention can be explained by the fact that the metal base is bifunctional in that (1) it acts as a reactant to neutralize the carboxy radicals in the polyester, and (2) it acts as a very beneficial additional independent ingredient in the polyester.

The function of the metal base as a reactant to neutralize the carboxy radicals is an important key to the present invention. Experimental results prove that such reaction takes place. For example, during the incorporation of zinc acetate in a polymerizable polyester resin there is liberated the volatile and easily detected acetic acid, showing that the carboxy radicals replace some of the acetic acid of the zinc acetate. Also, incorporation of zinc oxide (or another of the metal bases) results in a stiffening of the mix, which is considered to result from the increased molecular size obtained by joining two long chain polyester molecules through reaction at the carboxy radicals with the bi-valent metal base. The most conclusive proof of the neutralizing effect of the metal base is that the acid number of a polymerizable polyester is appreciably reduced by the addition of the metal base. For example, three samples of an ethylene glycol-maleate polyester composition prepared as hereinbefore described, having an acid number of 29.4, were milled on differential rubber rolls with zinc oxide in amounts respectively equal to 0.8 per cent, 9 per cent and 36 per cent of the polyester sample; the resulting acid numbers of the three samples were 21.5, 19.3 and 9.2 respectively. It is apparent that the extent of the neutralization is not in direct proportion to the amount of base used, but this may be explained on the basis of steric hindrance as well as on the basis of the analytical difficulties encountered in the determination of the acid number.

It is a fundamental aspect of the applicant's invention that he has discovered a new reactant, a metal base, which can be used to react with the carboxy radicals to form a strong, stable bond which is much more resistant to water than are the carboxy radicals of the polyester. It is an advantage of the instant invention that because of this reaction polyesters having relatively high acid numbers may be treated so as to make them industrially acceptable. It is because of the desirability of this reaction that a linear polyester is preferred for use in the invention, presumably because steric hindrance is thereby reduced.

In view of the fact that the fundamental function of the metal base in the practice of the invention is to react so as to neutralize the carboxy radicals in the polyester molecules, it would be expected that the most alkaline and most active bases would be the most effective. Experimental results such as those given in Tables 2 and 3 demonstrate that almost the exact opposite is true and, instead, the least alkaline bases and the bases of the least active (i. e., heaviest) metals are the most effective. Again, it is not desired to limit the invention to any particular theory, but it is believed that the foregoing unusual and unexpected behavior of the metal base of the invention can be explained by the fact that the metal base acts as an additional independent ingredient in the polyester. It has been ascertained by experiments that in the usual practice of the invention not all of the metal base can be used up in the neutralization reaction with the carboxy radicals of the polyester. First of all, there must always be a certain amount of the metal base which is simply ensnared in the filler and the maze of polyester chains. Secondly, in the ordinary practice of the invention the amount of the metal base used is more than that theoretically required to neutralize all the carboxy radicals. It is believed that the presence of the metal base per se in the polyester brings about one of the most important advantages of the instant invention, namely, the elimination of corrosion of steel molds by a polyester molding composition. Corrosion of molds is believed to be caused by the acids (particularly phthalic and maleic acids) which are released from the polyesters during the molding operation, possibly by partial decomposition of the polyesters or possibly by volatilization of unreacted acid in the polyesters. Polyester molding compositions embodying the invention are unique in that they do not corrode molds, presumably because the metal base present prevents the escape of the acid by reacting therewith. Thus, it can be seen that the metal base, as a reactant, is bi-functional in that some of it reacts first to neutralize the polyester when initially incorporated therein, and some of it remains as an ingredient in the polyester and reacts with the acid liberated during molding or during subsequent use under extreme conditions.

The presence of some of the metal base as an ingredient in the polyester does not, of course, alter the fact that an essential function of the metal base is that of a reactant for neutralizing the carboxy radicals of the polyester, but it may limit the maximum proportion of a particular metal base which may be used in the practice of the invention. The unreacted particles of the metal base present in the polyester are so completely occluded in the polyester composition that they may be assumed to act as inert filler material, and for many purposes it is believed that the metal base present is substantially inert, but it has been found that by means of comparatively delicate tests, such as water-resistance tests, it is possible to demonstrate the differences in properties that different metal bases impart to the polyester. In some instances the effect of the presence of the metal base is quite pronounced, for example, in the use of a hydrated metal base in the practice of the invention. Since it is one of the essential purposes of the invention to exclude water from the polyester, it is not ordinarily desirable to deliberately incorporate water in the polyester even in combined form as in a hydrated metal base, and this is demonstrated by the fact that a substantial quantity of a metal oxide such as zinc oxide may be used, whereas only a relatively small amount of the (hydrated) zinc hydroxide can be used in the practice of the invention without imparting undesirable properties to the polyester. For this reason metal bases which are not hydrated are clearly preferred for use in the invention, and hydrated metal bases are used only in unusual situations and then ordinarily in very small amounts.

The amount of the metal bases used in the invention is simply an amount sufficient to improve the water resistance attainable upon polymerization of the polyester composition. The basis of the invention is that a remarkably water resistant product is obtained if the metal base is used as a reactant to neutralize the carboxy radicals of the polyester molecules as well as those of the acids escaping during final polymerization.

In actual practice the amount of the metal base used may range from a mere appreciable amount based on the chemical function of the metal base (i. e., the slightest excess over that amount required to neutralize the polyester, so that even with a theoretically complete reaction there would still be a slight amount of metal base present) to a maximum proportion which depends upon the properties of the individual metal base. In other words, the applicant has discovered that very desirable properties such as water resistance may be imparted to the polyester by incorporation therein of the metal base, the water resistance imparted by incorporation of a specific metal base increasing with the incorporation of each additional increment of the base until, at a certain maximum proportion of the base, undesirable properties imparted by the base to the polyester counterbalance the advantage obtained in water-resistance. The exact maximum proportion of the metal base for use in the invention varies with different bases. For example, in the case of a hydrated metal base only a relatively small proportion (i. e., usually not more than 5 per cent of the composition) may be incorporated before it is observed that the undesirable properties counterbalance the advantages. The considerations involved include the alkalinity, chemical activity and solubility of the metal base, as well as the physical character of the metal base when it is considered merely as a portion of the filler.

Ordinarily the amphoteric metal bases are sufficiently inactive and insoluble so that the essential consideration in the determination of the maximum permissible proportion is purely a physical matter, and such a base is considered a part of the filler. The filler may consist of such a metal base alone or in admixture with other non-fibrous mineral fillers (e. g., kaolin), if strength is not an essential requirement of the polyester; but in most cases a fibrous filler is employed and a metal base to fibrous material ratio of about 6:1 is the maximum proportion of the amphoteric metal base which may be used without detracting from the effect of the fibrous material. In a molding compound embodying the invention the preferred proportion of such a metal base ranges from about 2 per cent to about 20 per cent of the total filler.

In the case of the amphoteric metal bases the preferred compounds are the oxides, since they do not release volatile material during neutralization. If water-resistance is of essential importance the preferred amphoteric metal (from which the base is formed) is cadmium or mercury. On the other hand, for most industrial purposes it is preferable to use a zinc base as zinc oxide, which is colorless, inexpensive, non-poisonous and extremely insoluble in water. Another advantage obtained by the use of the amphoteric metal bases arises from the fact that such bases are not sufficiently alkaline to affect deleteriously any of the usual additives or modifiers, such as catalysts, inhibitors and lubricants.

In the case of the non-amphoteric metal bases, the oxides may be preferred in situations where it is essential that the base release no volatile material during neutralization; but these oxides are more active chemically and more soluble than the amphoteric metal bases, and, accordingly, the proportions in which they may be used are limited. In general, the preferred non-amphoteric metal bases are the carbonates, since these compounds are insoluble, inexpensive and not sufficiently alkaline to affect deleteriously any of the usual additives. These carbonates may be used in substantially the same proportions as the amphoteric metal bases. Among the non-amphoteric metals (from which the base is formed) the preferred metals are the alkaline earth metals, and among the alkaline earth metals the preferred metal is barium (barium carbonate having been found to give extremely good results in the practice of the invention).

In accordance with the present invention, a greatly improved polymerized polyester resin is produced by carrying out a procedure which comprises the following steps:

(1) Esterification of a polyhydric alcohol with a polyhydric acid to obtain a polymerizable unsaturated linear polyester;

(2) Incorporation of a base formed of a metal of group II in the polymerizable unsaturated polyester, before substantial polymerization of such polyester; and (3) Polymerization of the polyester to produce a hardened resin.

As hereinbefore described, the esterification of step (1) is carried out under such conditions that polymerization does not take place to any substantial extent. After the esterification is complete, the metal base is incorporated in the polyester and the reaction involving the fixing of the carboxy radicals in the polyester takes place. In the present method, the esterification is completed before the incorporation of the metal base since the presence of such metal base would interfere with the esterification reaction. In fact, if the metal base were added before the esterification is completed, all of the metal base would immediately react to form metal salts with the carboxylic acids present which, in turn, would cause shorter polyester chains to be produced, and the resulting product would consist of useless short chain polyesters and actually would contain no metal base per se, but only zinc salts.

Although it is important that the metal base be added after esterification is complete, it is equally important that the esterification be such that a linear polyester is produced. It has been found that, unless the polyester is linear, the addition of the metal base causes little or no neutralization of the polyester, apparently because of steric hindrance. In other words, the cross-linked three-dimensional polyester molecules are large and complex in structure and contain carboxy radicals throughout their structure. The structure of a linear polyester apparently is sufficiently simple to be adapted for comparatively complete reaction with the metal base; but the structure of non-linear polyesters (often referred to as alkyds) is apparently so complex that most of the carboxy radicals are blocked off from the metal base, and an appreciable amount of neutralization takes place only when quite elaborate and thorough methods of intimately incorporating the metal base are used.

The metal base, in the form of finely divided particles, may be incorporated in the polymerizable polyester by any of the known methods hereinbefore suggested for the incorporation of a filler in the polyester. In the production of a molding compound or any other filler-containing polyester composition embodying the invention, the metal base may be incorporated when the filler is incorporated or before or after the filler is incorporated. Ordinarily it is preferable to form an intimate mixture of the filler and the metal base (sometimes including a catalyst), and then to incorporate the mixture in the polyester in the customary manner.

Example 1

A material embodying the invention comprising a polymerizable unsaturated polyester and a metal base, for example, a metal hydroxide, may be prepared by carrying out the following procedure: A polymerizable unsaturated linear polyester is prepared by the procedure hereinbefore described from a charge consisting of 1.05 mols of monoethylene glycol, one mol of maleic anhydride and an amount of hydroquinone equal to 0.04 per cent of the charge. The charge is heated to 220° C. (over a period of two hours) and is held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (2 parts) and benzoyl peroxide (2 parts), as a catalyst, to form a solution. A composition consisting of the polymerizable polyester solution so prepared, an amount of asbestos equal to 23 per cent of the composition, an amount of kaolin (Georgia clay) equal to 38 per cent of the composition, an amount of zinc hydroxide equal to 6 per cent of the composition, and, as a lubricant, an amount of zinc stearate equal to 2 per cent of the composition is then milled on a heated two-roll differential speed rubber mill at the lowest temperature at which a homogeneous mass can be obtained (not more than about 75° C.). The resulting composition is removed in sheets, is allowed to solidify fully while at about 80–90° F. and then is granulated in a high-speed cutter to a maximum particle diameter of about ⅛ inch. The granulated composition is compression molded to produce test pieces. The water absorption of a test piece (prepared as hereinbefore described) immersed in cold water is found to be .030 gram at the end of one day, .046 gram at the end of two days or 0.130 gram at the end of seven days.

Example 2

A material embodying the invention comprising a polymerizable unsaturated polyester and a metal base, for example, a metal sulfide, may be prepared by carrying out a procedure which is the same as that described in Example 1 except that an equal amount of zinc sulfide is used instead of the zinc hydroxide. The water absorption test results for the pieces so obtained are as follows:

|  | Grams |
|---|---|
| Boiling water for 1 hour | 0.151 |
| Cold water for 1 day | 0.141 |
| Cold water for 2 days | 0.223 |
| Cold water for 7 days | 0.294 |

Example 3

A material embodying the invention comprising a polymerizable unsaturated polyester and a metal base, for example, a metal borate, may be prepared by carrying out a procedure which is the same as that described in Example 1 except that an equal amount of zinc borate is used instead of the zinc hydroxide. The water absorption test results for the pieces so obtained are as follows:

|  | Grams |
|---|---|
| Boiling water for 1 hour | 0.139 |
| Cold water for 1 day | 0.103 |
| Cold water for 2 days | 0.153 |
| Cold water for 7 days | 0.243 |

Example 4

A material embodying the invention comprising a polymerizable unsaturated polyester, a fibrous filler mixture and a metal base, for example, a metal oxide, may be prepared by carrying out the following procedure: A polymerizable unsaturated linear polyester is prepared by the procedure hereinbefore described from a charge consisting of 0.9 mol of monoethylene glycol, 0.15 mol of propylene glycol, 1.0 mol of maleic anhydride and an amount of hydroquinone equal to 0.04 per cent of the charge. The charge is heated to 230° C. (over a period of two hours) and is held at 230–235° C. for five hours. The resulting polyester (90 parts), which has an acid number of about 30, is cooled to 60–80° C. and is mixed thoroughly with diallyl phthalate (15 parts) and a paste of tricresyl phosphate (2 parts) and benzoyl peroxide (2 parts), as a catalyst, to form a solution. A composition consisting of 40 parts of the foregoing polymerizable polyester solution, 30 parts of asbestos, 15 parts of cellulose flock, 10 parts of kaolin, 5 parts of zinc oxide, and, as a lubricant, 2 parts of zinc stearate is then milled for 10–12 minutes on a heated two-roll differential speed rubber mill at the lowest temperature at which a homogeneous mass can be obtained (not more than about 75° C.). The resulting material is removed in sheets and cooled by rolling the sheets with cold rolls to a sheet thickness of about ¼ inch. Some of the sheeted material is compression molded for one minute at 4500 pounds per square inch of projected area in a mold heated with steam at 75 pounds per square inch gauge pressure to produce seven-gram two-inch disks. The water absorption test results for the pieces so obtained are as follows:

|  | Grams |
|---|---|
| Boiling water for 1 hour | 0.118 |
| Cold water for 1 day | 0.061 |
| Cold water for 2 days | 0.093 |
| Cold water for 7 days | 0.180 |

A procedure is carried out which is the same as that described in the foregoing paragraph except that cadmium oxide is used instead of zinc oxide. The water absorption test results for the pieces so obtained are as follows:

|  | Grams |
|---|---|
| Boiling water for 1 hour | 0.120 |
| Cold water for 1 day | 0.066 |
| Cold water for 2 days | 0.100 |
| Cold water for 7 days | 0.204 |

A procedure is carried out which is the same as that described in the foregoing paragraph except that no cadmium oxide is used and the amount of kaolin used is 15 instead of 10 parts. The water absorption test results for the pieces so obtained are as follows:

|  | Grams |
|---|---|
| Boiling water for 1 hour | 0.138 |
| Cold water for 1 day | 0.098 |
| Cold water for 2 days | 0.149 |
| Cold water for 7 days | 0.286 |

Example 5

A material embodying the invention comprising a polymerizable unsaturated polyester, a fibrous filler mixture and a metal base, for example, a metal carbonate, may be prepared by carrying out a procedure which is the same as that described in the first paragraph of Example 4 except that an equal amount of zinc carbonate is used instead of the zinc oxide. The water absorption test results for the pieces so obtained are as follows:

| | Grams |
|---|---|
| Boiling water for 1 hour | 0.121 |
| Cold water for 1 day | 0.086 |
| Cold water for 2 days | 0.134 |
| Cold water for 7 days | 0.269 |

A procedure is carried out which is the same as that described in the foregoing paragraph except that calcium carbonate is used instead of zinc carbonate. The water absorption test results for the pieces so obtained are as follows:

| | Grams |
|---|---|
| Boiling water for 1 hour | 0.124 |
| Cold water for 1 day | 0.090 |
| Cold water for 2 days | 0.139 |
| Cold water for 7 days | 0.275 |

A procedure is carried out which is the same as that described in the foregoing paragraph except that strontium carbonate is used instead of calcium carbonate. The water absorption test results for the pieces so obtained are as follows:

| | Grams |
|---|---|
| Boiling water for 1 hour | 0.129 |
| Cold water for 1 day | 0.096 |
| Cold water for 2 days | 0.148 |
| Cold water for 7 days | 0.285 |

Example 6

A material embodying the invention comprising a polymerizable unsaturated polyester, a fibrous filler mixture and a metal base, for example, a metal hydroxide, may be prepared by carrying out a procedure which is the same as that described in the first paragraph of Example 4 except that the amount of kaolin used is 14 instead of 10 parts, no zinc oxide is used, and 1 part of calcium hydroxide is used. The water absorption test results for the pieces so obtained are as follows:

| | Grams |
|---|---|
| Cold water for 1 day | 0.075 |
| Cold water for 2 days | 0.109 |
| Cold water for 7 days | 0.235 |

A procedure is carried out which is the same as that described in the foregoing paragraph except that the amount of kaolin used is 13 instead of 14 parts and the amount of calcium hydroxide used is 2 instead of 1 part. The water absorption test results for the pieces so obtained are as follows:

| | Grams |
|---|---|
| Cold water for 1 day | 0.086 |
| Cold water for 2 days | 0.121 |
| Cold water for 7 days | 0.269 |

From the foregoing results it can be seen that the optimum proportion of a metal hydroxide such as calcium hydroxide which may be used in the practice of the invention is nearer 1 per cent than 2 per cent. As hereinbefore mentioned, hydrated metal bases such as the hydroxides are used in relatively small proportions in the practice of the invention.

Example 7

A material embodying the invention comprising a polymerizable unsaturated polyester, a fibrous filler mixture and a metal base, for example, a metal silicate, may be prepared by carrying out a procedure which is the same as that described in the first paragraph of Example 4 except that an equal amount of calcium silicate is used instead of the zinc oxide. The water absorption for a test piece so prepared, immersed in cold water for one day, is 0.083.

A procedure is carried out which is the same as that described in the foregoing paragraph except that magnesium silicate is used instead of calcium silicate. The water absorption for a test piece so prepared, immersed in cold water for one day, is 0.087.

Example 8

The improved electrical properties of an infusible polyester embodying the invention may be shown by carrying out procedures which are the same as that described in Example 1 except that different amounts of kaolin are used and various metal bases are used. Table 4 (below) more specifically describes the compositions from which the test pieces are molded by specifying the chemical formula of the base used (column 1), the amount of such of such metal base used, in per cent of the composition (column 2), and the amount of kaolin used, in per cent of the composition (column 3). Also in Table 4 the electrical properties of the test pieces so prepared are given as the dielectric constant (K) at 60 cycles (column 4), the dielectric constant (K) at $10^6$ cycles (column 5) and the power factor (PF) at $10^6$ cycles (column 6).

TABLE 4

| Metal Base | | Kaolin, amount percent | Electrical properties | | |
|---|---|---|---|---|---|
| Base | Amount percent | | 60 cycles K | $10^6$ cycles | |
| | | | | K | PF |
| Col. 1 | Col. 2 | Col. 3 | Col. 4 | Col. 5 | Col. 6 |
| | | 40 | 7.30 | 5.15 | 0.0376 |
| ZnO | 5 | 35 | 7.23 | | 0.0362 |
| MgCO₃ | 5 | 35 | 7.14 | 4.95 | 0.0342 |
| CaO | 2 | 38 | 7.18 | 4.93 | 0.0354 |
| CaCO₃ | 5 | 35 | 6.78 | 4.95 | 0.0322 |
| SrO | 2 | 38 | 6.98 | 5.04 | 0.0359 |
| SrCO₃ | 3 | 35 | 6.41 | 4.95 | 0.0305 |
| CdO | 5 | 35 | 6.64 | 5.13 | 0.0305 |
| HgO | 5 | 35 | 6.52 | 4.93 | 0.0316 |
| Zn(OH)₂ | 2 | 38 | 6.93 | 5.08 | |
| BaCO₃ | 5 | 35 | 6.42 | 4.92 | 0.0315 |

From Table 4 it can be seen that the oxides of the amphoteric (heavy) metals (i. e., cadmium and mercury) impart very good electrical properties to the polyester. Also, it can be seen that the alkaline earth metal carbonates impart the greatest improvement in electrical properties to the polyester, and that particularly good results are obtained using barium or strontium carbonate.

I claim:

1. A heat-hardenable composition comprising (1) a filler, (2), as a binder therefor, a polymerizable unsaturated alkyd resin whose molecule contains a plurality of polymerizably reactive $\Delta^{2,3}$-enedioyl groups, (3) a base formed of a metal of group II and (4) a catalyst of the class consisting of organic peroxides and organic ozonides, the total weight of (1) and (3) being from ⅔ to 3 times the weight of (2), and the weight of (3) being from 2 to 20 per cent of the total weight of (1) and (3).

2. A heat-hardenable composition as claimed in claim 1 wherein the base is formed of a non-amphoteric metal of group II.

3. A heat-hardenable composition as claimed in claim 1 wherein (1) is a mineral filler, and the total weight of (1) and (3) is from 3/2 to 7/3 times the weight of (2).

4. A heat-hardenable composition as claimed in claim 1 wherein the base is formed of an amphoteric metal of group II.

5. A heat-hardenable composition comprising (1) a filler, (2), as a binder therefor, a polymerizable unsaturated alkyd resin whose molecule contains a plurality of polymerizably reactive $\Delta^{2,3}$-enedioyl groups and (3) a substance of the class consisting of oxides and carbonates of metals of group II, the total weight of (1) and (3) being 2/3 to 3 times the weight of (2), and the weight of (3) being from 2 to 20 per cent of the total weight of (1) and (3).

6. A heat-hardenable composition as claimed in claim 5 comprising a carbonate of a non-amphoteric metal of group II.

7. A heat-hardenable composition as claimed in claim 5 comprising barium carbonate.

8. A heat-hardenable composition comprising a polymeriable unsaturated alkyd resin whose molecule contains a plurality of polymerizably reactive $\Delta^{2,3}$-enedioyl groups and an oxide of a metal of group II.

9. A heat-hardenable composition as claimed in claim 8 that comprises zinc oxide.

ARTHUR M. HOWALD.

References Cited in the file of this patent

UNITED STATES PATENTS

| Number | Name | Date |
|---|---|---|
| 2,195,362 | Ellis | Mar. 26, 1940 |
| 2,255,313 | Ellis | Sept. 9, 1941 |
| 2,260,005 | D'Alelio | Oct. 21, 1941 |
| 2,429,219 | Cowan et al. | Oct. 21, 1947 |
| 2,448,572 | Biggs | Sept. 7, 1948 |
| 2,549,732 | Weaver | Apr. 17, 1951 |

FOREIGN PATENTS

| Number | Country | Date |
|---|---|---|
| 610,137 | Great Britain | Oct. 12, 1948 |